July 3, 1962 P. GRANELLI 3,041,926
AUTOMATIC PLURAL FILM PROJECTION APPARATUS
Filed July 5, 1960 2 Sheets-Sheet 1

INVENTOR.
P. Granelli
BY
ATTORNEYS

July 3, 1962

P. GRANELLI 3,041,926

AUTOMATIC PLURAL FILM PROJECTION APPARATUS

Filed July 5, 1960

INVENTOR.
P. Granelli
BY
Richardy Geier

ATTORNEYS

United States Patent Office 3,041,926
Patented July 3, 1962

3,041,926
AUTOMATIC PLURAL FILM PROJECTION APPARATUS
Pietro Granelli, Rome, Italy, assignor to Società Internazionale Fonovisione, Rome, Italy, an Italian company
Filed July 5, 1960, Ser. No. 40,911
Claims priority, application Italy July 10, 1959
6 Claims. (Cl. 88—17)

The machines of the so-called "cinebox" type are generally known, in the form of cabinets placed in places of gathering and recreation, capable of containing a plurality of sound movie films, which can be individually selected and viewed. These machines differ from each other in certain structural and functional characteristics, the most important of which concern the devices used to store the greatest number of films and to simplify as much as possible the selection and projection of the films. Thus, there are machines in which each film is mounted on its own feed reel and has a single take-up reel with devices to offer the end of the selected film to the core of the said take-up reel. In other cases the films are all mounted on permanent reel pairs, in alignment with projection devices.

The present invention is concerned with substantial mechanical improvements which provide for the machine advantages in terms of practicality, simplicity and reliability of the operations for the projection of the selected film. Furthermore, according to one embodiment, means are provided for selecting a new film to be projected without having to wait until the film previously viewed and listened to, is completely rewound on the supply reel.

According to the invention, for each film there is one pair of reels: a feed reel on which the film is wound when the machine is in a position of rest, and a take-up reel to which, in the same condition, the film is attached by its starting end. Each pair of reels is arranged on the same radial plane and is mounted on revolving drums rigidly attached to each other, so as to maintain each pair of reels rigidly parallel.

According to the said variation, the take-up reels are mounted on a single drum, from which project the arms on which the feed reels are mounted. The drum, by revolving, moves to projection position, i.e. in alignment with the optical and feed devices, the selected film, while on the same shaft on which the drum revolves are mounted, on revolving sleeves, the arms carrying the electrical controls for the feeding and rewinding of the film on the feed spool, so that, at the end of the projection, the general reel-carrying drum may be caused to rotate for the selection and positioning of a new film even before the film previously projected is re-wound on its feed reel. This happens because the said two rotating arms are locked on the reel-carrying drum and follow it even when it is being moved for the positioning of the new film. When the previously projected film is completely rewound, the said arms, actuated by a suitably damped spring, return in alignment with the selected film so that the projection cycle can re-start.

The detailed description of the machine will be more easily understood by referring to the enclosed drawings which represent, as non-limiting examples, certain preferred embodiments of the invention.

In the drawings:
FIG. 1 represents the top of the cabinet containing the machine, showing the slot for the coin or slug and the control button;

Figure 1:
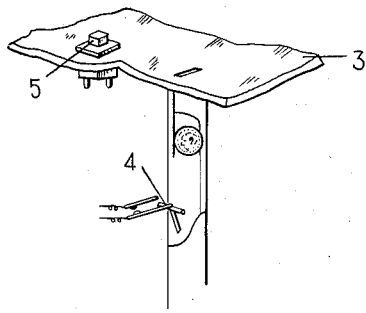
Figure 2:
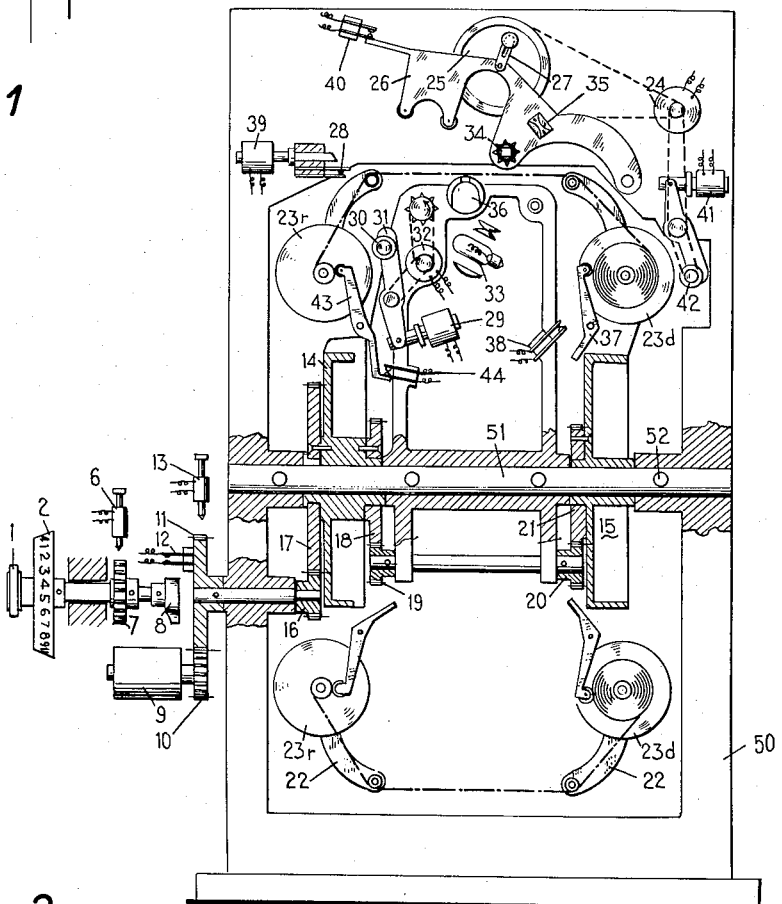
FIG. 2 is a view, in partial cross-section, of the mechanisms which perform the selection of the desired pair of reels, the introduction thereof into the projection system and the rewinding of the film, on completion of projection, onto the feed reel.

With special reference to FIGURES 1 and 2, the part of the machine containing the various operating mechanisms is a case 50 of substantially rectangular form, across which runs, between the parallel front and rear faces, a strong shaft 51 fastened to the machine frame by pins 52 which prevent it from rotating.

Having selected the desired film by rotating the knurled knob 1 and brought the number of the said film on the numbered disc 2 opposite a reference mark, a coin or slug is dropped into the slot 3 of a coin box of known type. Falling down, the coin or slug closes contact 4 and feeds current into the machine circuit. Push button 5 feeds current into solenoid 6 which, by means of positioner 7, locks the knob 1 in the selected position.

Attached to the positioner 7 is a cam 8 which, by effect of the rotation of knob 1 by hand, presents its lobe in a given angular position corresponding to the projection position of the selected film.

Solenoid 6, when excited, energizes motor 9 which, by means of gear 10, rotates wheel 11 on which is fixed switch 12 which, when actuated by the lobe of cam 8, switches off motor 9 and energizes solenoid 13. The latter locks wheel 11 and with it drums 14 and 15 which are connected to the wheel rigidly by means of the train of gears marked 16, 17, 18, 19, 20 and 21.

Drums 14 and 15 carry, in radial arrangement, a plurality of forks 22, on each of which is mounted one pair of film reels 23d—23r.

On the latter two reels is arranged the film, initially wound on feed reel 23d mounted on drum 15, the end of the film being attached to the core of the corresponding take-up reel 23r, mounted on drum 14, as it can be seen clearly in FIG. 2.

When excited, solenoid 13 energizes motor 24, which drives flywheel 25 into rotation. Consequently, pressure arm 26 is lowered by the action of a connecting rod 27, preparing the film for projection. The same pressure arm 26, at the end of its travel, closes switch 28 which disconnects flywheel 25 by opening an electromechanical coupling, and energizes relay 29. The latter feeds current into motor 32, which moves arm 31 bringing wheel 30 into contact with the flanges of take-up reel 23r, which revolves and causes the film to run through the path described by pressure arm 26 and to wind on its core. The same switch 28, as pressure arm 26 is lowered, lights up the lamp 33, which together with the continuous-feed optical system 34, with lens 35 and sound head 36, projects the film.

When the film is entirely unwound from feed reel 23d, pressure lever 37 will have assumed a position in which it closes contact 38, which de-energizes relay 29, feeds current to motor 24 driving flywheel 25, and energizes relay 39, which unlocks pressure arm 26 and allows it to return to its rest position, having reached which the arm closes contact 40. The switch 28, released by pressure arm 26, switches off the projection lamp 33. Contact 40, which is closed by pressure arm 26 at the end of its return stroke, causes flywheel 25 to become uncoupled from motor 24 and energizes relay 41, which causes wheel 42, driven by motor 24, to contact the flanges of reel 23d, thus starting the rewinding of the projected film on its reel 23d.

When the entire film is re-wound, i.e. returned to the initial position, the pressure lever 43 will have reached a position in which it closes contact 44, which de-energizes relays 41, switches off motors 24 and 32 and de-energizes relays 13 and 6, thus enabling the machine to prepare for the selection of another film and the repetition of the projection cycle.

Figure 3:
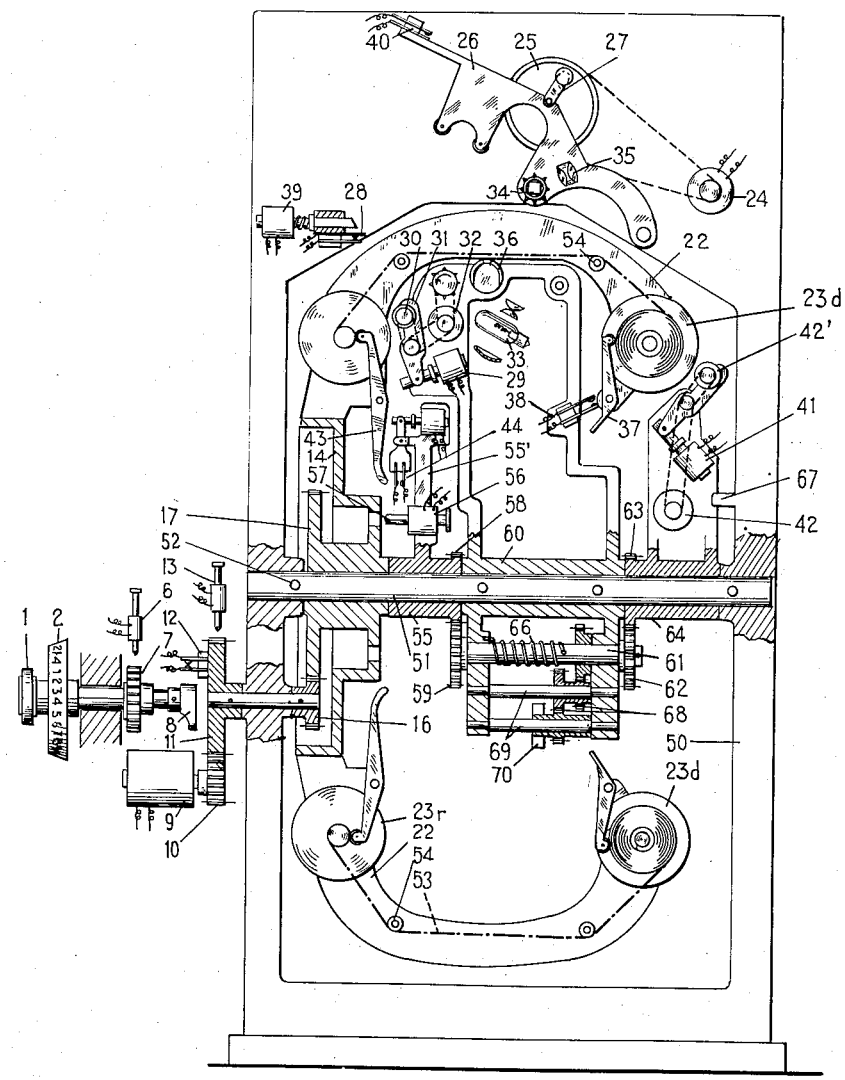
FIG. 3 is a view similar to that shown in FIG. 2, showing a variation or alternate arrangement whereby a new film can be selected and brought to projection position even before the previously projected film is completely rewound on its feed reel.

FIG. 3 represents, as indicated above, an alternate arrangement of the machine described in the foregoing.

The sleeve 14, mounted idle on shaft 51, carries attached to its edge a plurality of arc arms 22 forming a projecting crown rotatable with the said sleeve around shaft 51. At the free ends of each of the arc arms attached to sleeve 14 are mounted reels 23d and 23r, respectively feed and take-up, between which runs film 53 on guide rollers 54 in the same manner described above.

While the unwinding and rewinding of the film in position for projection takes place in the manner described above, with this alternate arrangement it is possible to select, after the film has passed completely from reel 23d to reel 23r, a new film and prepare it in projection position without waiting for the rewinding of the last film to be completed.

This is achieved by means of a bushing 55 mounted idle on shaft 51 and fitted with an arm 55' which carries a solenoid 56 energized by contact 38 at the beginning of the return of the film for rewinding on reel 23d. Solenoid 56 causes a pin 57 to enter a hole in sleeve 14 positioned in correspondence to the pair of reels which have just finished projecting the film. Thus, bushing 55 and arm 55' are locked onto the said sleeve.

Bushing 55 is fitted with a gear 58 with which meshes gear 59 attached to a shaft 61 mounted on the fixed frame 60 attached to shaft 51. At the other end of shaft 61 is attached gear 62, which meshes with gear 63 on bushing 64 attached to the arm on which are mounted relay 41 and motor 42. The latter, through roller 42', causes the film to rewind on reel 23d.

As a result of the rigid coupling between sleeve 14 and bushings 55 and 64, obtained by means of pin 57 and through gears 59, 62 and shaft 61, when by actuating knob 1, another film is selected for projection, the whole system of reels 23d—23r and arms 22 is driven into rotation by motor 9, and with it bushings 55 and 64 together with the parts attached thereto.

The angular movement which can be imparted on sleeve 14 for the selection of the new film will be not more than 360°, i.e. one complete turn of the arm assembly 22. To this angular movement corresponds an equal winding or unwinding of a coil spring 66, one end of which is attached to shaft 61 and the other to fixed frame 60. Thus, when, after the positioning of the new film, relay 56 energized by contact 44 on completion of the rewinding of the film on reel 23d withdraws pin 57 and releases bushing 55, the latter will be caused by spring 66 to return to the initial position (that shown in the drawing), the arm of bushing 64 stopping against a lug 67 projecting from the machine frame.

To prevent a violent return of the arm to the initial position when pulled by spring 66, provision is made for a multiplication system comprising several pairs of gears 68 mounted on shafts 69, the last of which carries a flywheel 70 which, because of its inertia and high speed, brakes the whole system. This arrangement may be replaced by any other of known type and having the same purpose.

Even though two preferred embodiments of the invention have been described herein as non-limiting examples, it will be evident to those skilled in the art that several variations and modifications may be introduced herein without departing from the spirit of the invention or from the scope of the following claims.

What is claimed is:

1. A machine for selectively projecting a plurality of films, said machine comprising, in combination, a plurality of feed reels, a plurality of take-up reels, means rotatably supporting said feed reels and said take-up reels in pairs with each of said feed reels having a corresponding alined take-up reel, each pair comprising a feed reel adapted to carry a separate wound film and a take-up reel having a core adapted to hold an end of said film; a selector device comprising a manually actuated knob, a numbered disc connected with said knob and means connected with the first-mentioned means for moving said reels to a position corresponding to the selected position of said knob and disc and for locking said disc in said position; and a mechanical and optical projection device comprising a swingable pressure arm, a motor, means operatively connecting said motor with said swingable pressure arm, means operatively connecting the second-mentioned means with the third-mentioned means for driving said motor to lower said swingable pressure arm when the second-mentioned means are actuated, a switch engaged by said swingable pressure arm when it is lowered, a projection lamp operatively connected with said switch, another motor, means operatively connected with said other motor for unwinding the selected film from its feed reel and upon its take-up reel, means operatively connecting said switch with said other motor for energizing said other motor when said switch is closed, means adapted to engage said feed reel and connected with the first-mentioned motor for actuating the first-mentioned motor to raise said swingable pressure arm when the film has been unwound from said feed reel, contacts adapted to be closed by said swingable pressure arm when it is raised, means adapted to engage said feed reel for rewinding said film upon said feed reel, and means connected with said contacts, the third-mentioned means and the last-mentioned means and operable upon the closing of said contacts to disconnect the first-mentioned motor from the third-mentioned means and to connect it with the last-mentioned means for the rewinding of said feed reel.

2. A machine for selectively projecting a plurality of films, said machine comprising, in combination, a drum, a plurality of feed reels, forks carried by said drum and radially supporting said feed reels upon said drum, another drum, a plurality of take-up reels, forks carried by said other drum and radially supporting said take-up reels upon said other drum, each of said feed reels having a corresponding alined take-up reel, whereby said reels are mounted in pairs, each pair comprising a feed reel adapted to carry a separate wound film and a take-up reel having a core adapted to hold an end of said film; a selector device comprising a manually actuated knob, a numbered disc connected with said knob and means connected with said drums for moving said drums to a position corresponding to the selected position of said knob and disc and for locking said disc and said drums in said position; and a mechanical and optical projection device comprising a swingable pressure arm, a motor, means operatively connecting said motor with said swingable pressure arm, means operatively connecting the first-mentioned means with the second-mentioned means for driving said motor to lower said swingable pressure arm when the first-mentioned means are actuated, a switch engaged by said swingable pressure arm when it is lowered, a projection lamp operatively connected with said switch, another motor, means operatively connected with said other motor for unwinding the selected film from its feed reel and upon its take-up reel, means operatively connecting said switch with said other motor for energizing said other motor when said switch is closed, means adapted to engage said feed reel and connected with the first-mentioned motor for actuating the first-mentioned motor to raise said swingable pressure arm when the film has been unwound from said feed reel, contacts adapted to be closed by said swingable pressure arm when it is raised, means adapted to engage said feed reel for rewinding said film upon said feed reel, and means connected with said contacts, the second-mentioned means and the last-mentioned means and operable upon the closing of said contacts to disconnect the first-mentioned motor from the second-mentioned means and to connect it with the last-mentioned means for the rewinding of said feed reel.

3. A machine for selectively projecting a plurality of films, said machine comprising, in combination, a drum, a plurality of feed reels, forks carried by said drum and radially supporting said feed reels upon said drum, another drum, a plurality of take-up reels, forks carried by said other drum and radially supporting said take-up reels upon said other drum, each of said feed reels having a corresponding alined take-up reel, whereby said reels are mounted in pairs, each pair comprising a feed reel adapted to carry a separate wound film and a take-up reel having a core adapted to hold an end of said film; a selector device comprising a manually actuated knob, a numbered disc connected with said knob, a button control, a solenoid actuated by said button control, a positioner firmly connected with said numbered disc and adapted to be locked by said solenoid, a cam firmly connected with said positioner, a motor actuated by said solenoid, a gear drive actuated by said motor, a switch carried by said gear drive and adapted to be actuated by said cam, said switch being operatively connected with said motor and switching off said motor when actuated, means connected with said switch, said gear and said drums for moving said drums to a position corresponding to the selected position of said knob and disc and for locking said disc and said drums in said position; and a mechanical and optical projection device comprising a swingable pressure arm, another motor, means operatively connecting said other motor with said swingable pressure arm, means operatively connecting the first-mentioned means with the second-mentioned means for driving said other motor to lower said swingable pressure arm when the first-mentioned means are actuated, a switch engaged by said swingable pressure arm when it is lowered, a projection lamp operatively connected with said switch, a third motor, means operatively connected with said third motor for unwinding the selected film from its feed reel and upon its take-up reel, means operatively connecting said switch with said third motor for energizing said third motor when said switch is closed, means adapted to engage said feed reel and connected with the second-mentioned motor for actuating the second-mentioned motor to raise said swingable pressure arm when the film has been unwound from said feed reel, contacts adapted to be closed by said swingable pressure arm when it is raised, means adapted to engage said feed reel for rewinding said film upon said feed reel, and means connected with said contacts, the second-mentioned means and the last-mentioned means and operable upon the closing of said contacts to disconnect the second-mentioned motor from the second-mentioned means and to connect it with the last-mentioned means for the rewinding of said feed reel.

4. A machine for selectively projecting a plurality of films, said machine comprising, in combination, a casing, an immovable shaft fixed to said casing, at least one drum rotatably mounted upon said shaft, a plurality of feed reels, a plurality of take-up reels, means connected with said drum for rotatably supporting said feed reels and said take-up reels in pairs with each of said feed reels having a corresponding alined take-up reel, each pair comprising a feed reel adapted to carry a separate wound film and a take-up reel having a core adapted to hold an end of said film; a selector device comprising a manually actuated knob, a numbered disc connected with said knob and means connected with said drum for moving the first-mentioned means to a position corresponding to the selected position of said knob and disc and for locking said disc and said drum in said position; a mechanical and optical projection device comprising a swingable pressure arm, a motor, means operatively connecting said motor with said swingable pressure arm, means operatively connecting the second-mentioned means with the third-mentioned means for driving said motor to lower said swingable pressure arm when the second-mentioned means are actuated, a switch engaged by said swingable pressure arm when it is lowered, a projection lamp operatively connected with said switch, another motor, means operatively connected with said other motor for unwinding the selected film from its feed reel and upon its take-up reel, means operatively connecting said switch with said other motor for energizing said other motor when said switch is closed, means adapted to engage said feed reel and connected with the first-mentioned motor for actuating the first-mentioned motor to raise said swingable pressure arm when the film has been unwound from said feed reel, contacts adapted to be closed by said swingable pressure arm when it is raised, means adapted to engage said feed reel for rewinding said film upon said feed reel, and means connected with said contacts, the third-mentioned means and the last-mentioned means and operable upon the closing of said contacts to disconnect the first-mentioned motor from the third-mentioned means and to connect it with the last-mentioned means for the rewinding of said feed reel; and a drum-coupling device comprising two bushings rotatably mounted upon said shaft, means connected with one of said bushings and the seventh-mentioned means for locking said drum with said one bushing when the film has been unwound, a rotary shaft, and meshing gears carried by said bushings and the last-mentioned shaft, said other bushing carrying the eighth-mentioned means.

5. A machine for selectively projecting a plurality of films, said machine comprising, in combination, a rotary drum, a plurality of feed reels, a plurality of take-up reels, means connected with said drum for rotatably supporting said feed reels and said take-up reels in pairs with each of said feed reels having a corresponding alined take-up reel, each pair comprising a feed reel adapted to carry a separate wound film and a take-up reel having a core adapted to hold an end of said film; a selector device comprising a manually actuated knob, a numbered disc connected with said knob and means connected with said drum for moving said drum along with the first-mentioned means to a position corresponding to the selected position of said knob and disc and for locking said disc and said drum in said position; a mechanical and optical projection device comprising a swingable pressure arm, a motor, means operatively connecting said motor with said swingable pressure arm, means operatively connecting the second-mentioned means with the third-mentioned means for driving said motor to lower said swingable pressure arm when the second-mentioned means are actuated, a switch engaged by said swingable pressure arm when it is lowered, a projection lamp operatively connected with said switch, another motor, means operatively connected with said other motor for unwinding the selected film from its feed reel and upon its take-up reel, means operatively connecting said switch with said other motor for energizing said other motor when said switch is closed, means adapted to engage said feed reel and connected with the first-mentioned motor for actuating the first-mentioned motor to raise said swingable pressure arm when the film has been unwound from said feed reel, contacts adapted to be closed by said swingable pressure arm when it is raised, means adapted to engage said feed reel for rewinding said film upon said feed reel, and means connected with said contacts, the third-mentioned means and the last-mentioned means and operable upon the closing of said contacts to disconnect the first-mentioned motor from the third-mentioned means and to connect it with the last-mentioned means for the rewinding of said feed reel; and a drum-coupling device comprising two rotary arms, means connected with one of said arms and the seventh-mentioned means for locking said drum with said one arm when the film has been unwound, said other arm carrying the eighth-mentioned means, means interconnecting said arms, a relay connected with the seventh-mentioned means and the ninth-mentioned means for unlocking said drum when the rewinding of the film has been completed and a spring connected with the last-mentioned means and wound when said arms are rotated along with said drum, said spring returning said arms to their initial positions when said drum is unlocked from said arms.

6. A machine in accordance with claim 5, comprising a braking device connected with the last-mentioned means.

References Cited in the file of this patent

UNITED STATES PATENTS

| | | |
|---|---|---|
| 2,180,639 | McMahon et al. | Nov. 21, 1939 |
| 2,206,134 | Streyckmans | July 2, 1940 |
| 2,290,071 | Rinaldy | July 14, 1942 |